Sept. 13, 1949.  B. SCHWARZ  2,481,786
CONTROL SYSTEM FOR ALTERNATING
CURRENT COMMUTATOR MOTORS
Filed Feb. 12, 1948  2 Sheets-Sheet 1

Inventor
Benno Schwarz
By [signature] Atty

Inventor
Benno Schwarz

Patented Sept. 13, 1949

2,481,786

UNITED STATES PATENT OFFICE 2,481,786

CONTROL SYSTEM FOR ALTERNATING CURRENT COMMUTATOR MOTORS

Benno Schwarz, Norwich, England

Application February 12, 1948, Serial No. 7,783
In Great Britain May 26, 1941

Section 1, Public Law 690, August 8, 1946
Patent expires May 26, 1961

8 Claims. (Cl. 318—244)

The invention relates to a control system for stator fed multi-phase commutator motors using an induction regulator for the voltage control in the rotor circuit.

The induction regulator is known as a means for obtaining voltage variation in A. C. supplies in regard to the numerical value and the phase position of the voltage and combination thereof.

For the purpose of controlling a stator fed A. C. commutator motor it is necessary to introduce in the rotor circuit a variable voltage of essentially fixed phase position which adds algebraically to the rotor voltage of the motor. The introduction of this variable voltage of constant phase position results in the desired speed variation.

It is moreover necessary to introduce a voltage component in the rotor circuit which is vectorially at right angles to the rotor voltage in order to obtain power factor correction of the rotor current which is essential for the operation of all but the smallest commutator motors and desirable even for commutator motors of small output.

The introduction of this phase shifting "compensating" voltage is not primarily conditioned by its influence on the power factor of the input from the supply taken by the motor, but more important by the necessity for reducing the rotor current to the minimum needed for obtaining the required torque, taking into consideration the current carrying capacity of the commutator and brushes and also in order to reduce the speed regulation between no load and full load and to increase the overload capacity and the efficiency of the whole arrangement.

Hitherto double induction regulators have been used to obtain variable voltages of constant phase position, as the conventional single induction regulator when fed in its primary from the constant supply voltage, produces in its secondary a voltage of constant magnitude and variable phase position.

In double induction regulators, the two secondary voltages produced, respectively, by the two individual single induction regulators which constitute the double induction regulator, are constant, but their relative phase position varies in such a way that their vectorial sum is variable numerically and has a constant vectorial position.

Besides the voltages, the magnetic fluxes in the two regulators and the internal currents in the windings are constant over the whole control range, irrespective of the magnitude of the resultant secondary voltage, if the supply voltage and the secondary current are constant.

In the case of the use of double induction regulators further measures have to be taken in order to obtain the above mentioned phase shifting voltage component at right angles to the variable voltage required for the speed adjustment.

The principal object of the present invention is to enable a single induction regulator to be used for the combined purposes of obtaining speed variation and power factor correction of a stator fed commutator motor.

This object is achieved, in accordance with the invention, by the application of a single induction regulator with at least three windings and an additional winding accommodated either in the motor or in a separate transformer.

Two of the windings of the induction regulator act as primary windings. They are connected together and one of them is connected to the supply. The third winding acts as a secondary winding and is connected in the rotor circuit of the commutator motor, in series with the above mentioned additional winding.

The principle of the invention will be readily understood from the accompanying diagrammatic drawings and the following explanation.

Figure 1:
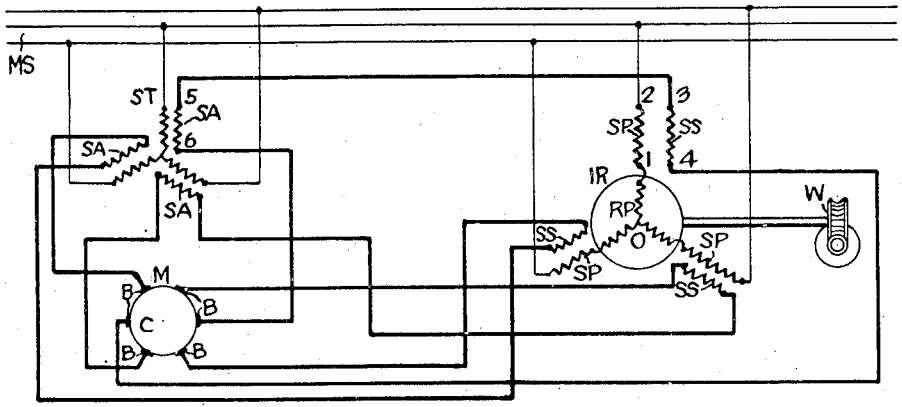
Figure 1 is an example of an arrangement according to the invention in which an auxiliary winding in the motor stator is used as the additional winding in the rotor circuit.

In Figure 1, M is an A. C. commutator motor in the stator of which are accommodated two windings ST and SA. C is the commutator which is connected to the rotor winding and has six brushes B.

IR is a single induction regulator having two stator windings SP and SS and one rotor winding RP. The rotor can be moved in relation to the stator by the operating mechanism W schematically shown in the example as a hand operated worm and worm wheel.

The stator winding SP of the induction regulator IR is connected to the same A. C. supply MS as the stator winding ST of the motor M, the connection being made as follows:

One end of each phase winding of the stator winding SP of the induction regulator IR is connected to the supply, and the other ends of said phase windings of SP are connected respectively, one to each of the winding phases of the rotor winding RP of the induction regulator IR. The winding RP is shown in star connection in the drawing, O indicating the star point, but it can, without changing the principle of the invention, be connected in delta connection.

The windings SP and RP function as primary windings for the induction regulator, and the winding SS functions as the secondary winding. The winding SS is shown schematically in the drawing as being accommodated in the stator of the induction regulator IR, that is to say, it is arranged in the same slots as the primary winding SP, but it can be equally well accommodated in the rotor slots together with the winding RP without deviating from the principle of the invention.

The secondary winding SS is, moreover, series-connected in open 3-phase connection with an additional winding SA, which in the example of Figure 1 is shown as an auxiliary stator winding of the motor M.

The open ends of each phase winding of the series-connected windings SA and SS are connected one to each of the commutator brushes B.

The open 3-phase connection so obtained and as shown in the drawing as applied by way of example to a 2-pole machine, results in a 6-phase feeding through the brushes B of the commutator C.

By starring the three open ends of either windings SA or SS and omitting three brushes, which, in Figure 1, are shown connected to these three ends, a 3-phase feed into the commutator C can be obtained.

Figure 1A:
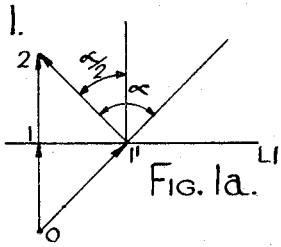
Figures 1a and 1b are vector diagrams illustrative of the functioning of the arrangement of Figure 1.
Figure 1B:
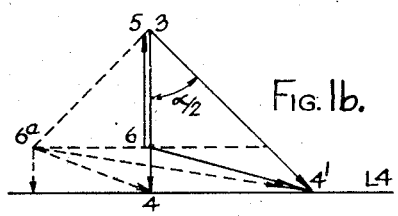

The vector diagrams shown in Figures 1a and 1b serve to explain the function of the arrangement.

The vector diagram of Figure 1a shows the voltages in the primary circuit of the induction regulator IR for one phase, that is to say the voltage vectors representing the voltages between one supply line and the star point 0 in Figure 1. The numerals appearing on Figure 1 correspond to the vectors in Figures 1a and 1b.

Assuming the rotor of the induction regulator IR to be in a position as diagrammatically indicated in Figure 1 such that the stator and rotor phase windings connected together are locally coaxial, the voltage in each of the windings RP and SP will have the same vectorial position. Assuming, moreover, that the number of turns per phase winding in both windings is equal, the voltage vector 0, 1 for the phase voltage of the rotor winding RP and the voltage vector 1, 2 for the phase winding of the stator winding SP will be equal. The sum total 0, 2 of the two voltages is then equal in magnitude and opposite in direction to, the supply voltage between one phase and neutral, the two voltages balancing each other.

If the rotor of the induction regulator IR is moved out of its indicated position by an electrical angle α in relation to the stator the two voltage vectors of the chosen place of RP and SP will be displaced by the angle α whilst the numerical values of the two vectors now indicated in Figure 1a as 0, 1' and 1', 2 respectively will still be equal. In other words the locus of the vector ends 1, 1' and so on will be the straight line L1 in Figure 1a.

The voltage vector diagram referring to the secondary circuit is shown in Figure 1b.

The transformation ratio between the windings SS and SP of the induction regulator IR on the one hand, and between the windings ST and SA in the motor stator on the other hand, are so chosen, according to the invention as to give the result hereinafter described.

Referring to Figure 1b the voltage vector 3, 4 for the phase winding of SS accommodated in the same slots of the induction regulator as the phase winding of SP, under consideration, will be proportional to, and if taken in the indicated direction, vectorially opposite to 1, 2 (Figure 1a).

The vectorial position of 3, 4 will, therefore, be as indicated in Figure 1b if the regulator is in its "neutral" position (α=0) in which position of the regulator, 0, 1 and 1, 2 have the same vectorial position as shown in Figure 1a.

The vector end of the voltage vector 3, 4 will change in position to 4' if the regulator rotor is moved out of the neutral position through the angle α, 3, 4' being again proportional and opposite in phase to 1', 2. The locus of the vector ends 4, 4' and so on, is therefore the straight line L4 in Figure 1b.

The vector 6, 5, represents the voltage of the winding phase of the additional winding SA, which, as it is accommodated in the same slots as one winding phase of the stator winding ST, has a constant voltage irrespective of the regulator position.

The arrangement assumed in Figure 1b is such that the vector 6, 5 is opposite in phase position to 3, 4 and that there is a numerical difference between the two values of voltage exemplified by the distance 6, 4. As the points 6 and 4 (Figure 1) are connected to opposite commutator brushes B, the voltage vector 6, 4 (Figure 1b) also represents the voltage fed into the commutator C at the neutral position of the regulator IR.

The vector 6, 4' represents the voltage fed into the commutator C with the regulator IR turned through the angle α from the neutral position.

By choosing the brush position so that the rotor voltage between the brushes B connected to the points 6 and 4 in Figure 1 has the same phase position as the straight line L4 in Figure 1b, the voltage component 4, 4' will cause a speed adjustment of the commutator motor M above or below synchronism, this difference in speed being approximately equal to the ratio of the magnitude of the voltage component 4, 4' to the rotor voltage at standstill.

The voltage component 6, 4 which is constant for all angles of α, is at right angles to L4 and can therefore serve as a compensating voltage producing a leading magnetising current in the rotor circuit of the motor M.

It will be realised from the vector diagram of Figure 1b that the vector 6, 5 can be bigger than 3, 4 in which case the voltage difference 6, 4 will change its vectorial direction if this is required, or is useful for the purpose of design.

The result achieved by the described arrangement is that above mentioned; namely by the use of a single induction regulator with three windings, two primary and one secondary winding, and the series connection of the secondary winding with an additional winding having a voltage component at right angles to the variable voltage component produced by the secondary winding of the regulator, the obtainment of a variable voltage of fixed phase position in combination with a constant voltage vectorially at right angles to the variable voltage.

It will be readily appreciated that the actual amount of both voltage components can be obtained for any supply voltage in line with the requirements for the design of the rotor of the motor, in so far as speed variation and phase compensation are concerned, as the different transformation ratios can be chosen accordingly.

It is, moreover, possible to arrange and choose the winding SA so as to obtain a voltage vector $6a$, 5 as shown in dotted line, thereby introducing a constant voltage component $6a$, 6 in the speed adjusting direction, and so shifting the speed range obtainable between the extreme regulator displacements, in relation to the synchronous speed. The voltage introduced in the rotor circuit is then $6a$, 4 and $6a$, 4' for the neutral position and for the angle of displacement $\alpha$.

The originally assumed voltage vector 6, 5 for the phase winding of winding SA gives, of course, a symmetrical speed range above and below synchronism, provided that the same maximum displacement angle is permissible for the regulator on both sides of its neutral position.

It will be appreciated that the magnitude of the output voltage is, theoretically, unlimited and, practically, only limited by the flux that can be carried by the induction regulator. An advantage of the present arrangement in this respect, is that the iron losses and copper losses, the magnetising current and the reactive voltage drop are smaller when less than the maximum voltage is required.

Comparing, for instance, the conditions where the angle $\alpha$ is changed from 60° to 0°, representing a change of the secondary voltage 3, 4 (Figure 1b) from double the minimum value to the minimum value, the flux is halved and the load current in the primary windings SP and RP of the regulator based on the same external current on the output side, is also halved. The result is, therefore, that the iron and copper losses and the magnetizing current are reduced approximately to a quarter, and the reactive voltage drop is reduced in proportion to the primary current.

The overall efficiency of the arrangement, which replaces a double induction regulator plus a compensating transformer or the equivalent of it, is on the average very much improved, for at least two reasons. Firstly, the whole output required is provided by one unit instead of two, which results in a comparatively higher efficiency and less magnetizing kva. Secondly, the maximum losses of this single induction regulator occur only at the maximum voltage output and, therefore, the average losses, taken over the whole voltage range, are comparatively small.

One general advantage of any of the arrangements according to the invention is that, as the theorectical voltage range of the variable output voltage is unlimited, higher voltages outside the predetermined range for continuous rating can be occasionally used for short time rating, by overfluxing the induction regulator temporarily.

One example, where such as procedure can be adopted usefully, is the case of a variable speed commutator motor of a certain fixed speed range but which, however, is required to operate for a short period, for instance, for threading or feeding purposes, outside such speed range.

Another case is the utilisation of this extended voltage range for starting or dynamic braking purposes only.

This results in a smooth start from standstill or breaking to standstill with temporary overloading of the induction regulator, such overloading being immaterial, in view of its short duration.

The invention thus enables an induction regulator of smaller size than usual to be employed, in view of the extended voltage range obtainable, thus resulting also on this account, in lower losses, lower magnetizing currents and lower costs than usual.

The additional winding SA which in Figure 1 is shown as an auxiliary winding in the motor stator can also be arranged as a secondary winding of a transformer. In order to obtain the same result as described in connection with the vector diagram Figure 1b the primary of such transformer is connected to the source of supply in the same way as the stator winding ST of the commutator motor M in Figure 1.

There are, however, other possibilities of utilising a transformer in connection with the invention, as hereinafter described with reference to Figures 2 and 3.

Apart from the voltage regulation in the rotor circuit the described single induction regulator can also be used for a simultaneous voltage regulation in the stator circuit of A. C. commutator motors which, in many cases, is desirable for the following reasons.

It is known that a limiting factor in the design and operation of A. C. commutator motors is the voltage between adjacent commutator bars, which cannot be increased above a certain limit dependent on the composition of the brushes used.

If this limit is exceeded, sparking takes place and also excessive heating of the brushes and of the commutator.

This is due to the flow of excessive currents consequent on the short-circuiting of turns of the rotor winding by brushes touching two or more commutator bars at the same time.

In the case of stator fed A. C. commutator motors, this voltage is dependent upon two conditions, namely, the amount of magnetic flux (taking into consideration, of course, the kind of rotor winding employed) and the difference between the actual speed and the synchronous speed of the machine.

The aforesaid voltage increases with decreasing speed in the sub-synchronous, and with increasing speed in the hyper-synchronous range.

Therefore, for a given magnetic flux and rotor winding, the speed range of such a machine is limited by the voltage between the commutator bars.

With the usual arrangements, the magnetic flux of the motor remains constant and this constancy is generally advantageous so long as the torque developed at the motor shaft is constant over the speed range.

There are many cases, however, in which a variable torque is required, either decreasing with decreasing speed, as for example in fans and centrifugal pumps, or decreasing with increasing speed, as for example in connection with different kinds of machine tools.

In such cases it has already been proposed to reduce the primary voltage, and thus the flux, in correspondence with the reduced torque requirement which has the advantage of reducing, simultaneously, the voltage between the commutator bars.

This renders possible an increased speed range for the same original layout of the machine and a reduction in the losses at the commutator brushes by the reduction of the above mentioned short-circuit currents and, therefore, less heating of these parts.

Moreover, the iron losses and the magnetizing current of the machine are reduced so that its efficiency and the power factor are improved in view of the reduced torque and output demand compared with the frame size of the motor.

The desired change in the stator voltage can be obtained by inserting a second secondary winding system of the described induction regulator into the stator circuit of the motor.

Figure 2:
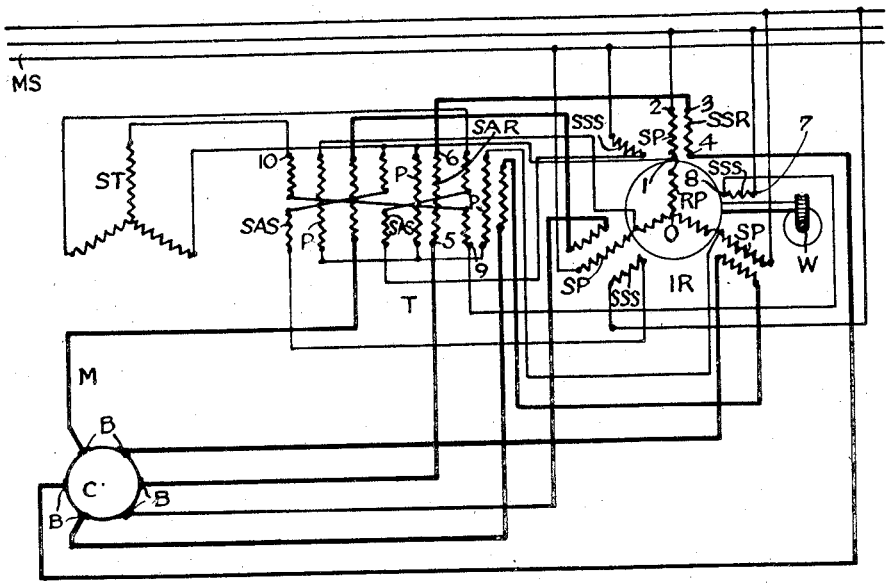
Figure 2 is an example of another arrangement according to the invention where the secondary winding of a separate transformer is used as the additional winding. Moreover, in this figure voltage control in the stator circuit of the commutator motor is incorporated.

In Figure 2 the same reference indications as in Figure 1 are used where applicable.

Referring to Figure 2, it will be seen that in addition to the motor M and the induction regulator IR a transformer T is included in the arrangement. The primary winding P of the transformer T is connected to the points of connection between the primary windings SP and RP of the induction regulator IR.

The transformer T has two secondary windings SAR and SAS. The winding SAR serves as the additional winding in the rotor circuit and is series-connected with the secondary winding SSR in the stator of the induction regulator IR.

The open ends of the two windings SAR and SSR are connected to opposite commutator brushes B, of the commutator C. The other secondary winding SAS of the transformer T is connected in series with a second secondary winding SSS in the stator of the induction regulator IR into the circuit of the stator winding ST of the motor M for the regulation of the voltage applied to the motor stator.

The vector diagrams Figures 2a, 2b and 2c will be referred to in the following explanation of the arrangement.

Figure 2A:
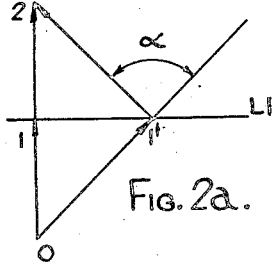
Figures 2a, 2b and 2c are vector diagrams illustrative of the functioning of the arrangement of Figure 2.

Figure 2a shows the voltage vector diagram for one phase of the primary circuit of the induction regulator. It will be understood in the same way as Figure 1a.

Figure 2B:
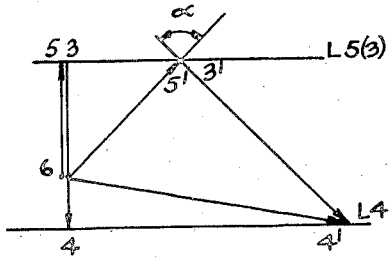
Figure 4:
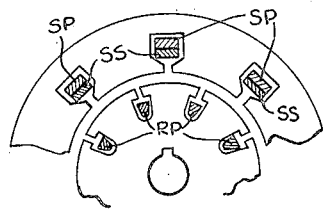
Figure 4 is a fragmentary schematic view showing part of the slotted rotor and stator of the induction regulator with the windings in the slots.

Figure 2b shows the voltage vector diagram for one phase of the rotor circuit.

For the neutral position (α=0) of the regulator, 3, 4 is again the voltage of the secondary winding SSR in the regulator stator, which, as previously explained, is proportional in magnitude and opposite in phase, to the primary voltage 1, 2 in the vector diagram, Figure 2a.

The voltage applied to the primary P of the transformer T is the voltage of the phase winding RP illustrated vectorially as 0, 1 in Figure 2a.

The voltage in the secondary winding SAR represented vectorially as 6, 5, in Figure 2b is proportional to and in the same vectorial direction as 0, 1, a suitable transformation ratio being again chosen for the purpose.

The resulting vector 6, 4, is as in the case of Figures 1 and 1b, the voltage applied to the commutator brushes B in the neutral position of the induction regulator IR.

On movement of the regulator through an angle α out of the neutral position, the vector end 5 moves to 5', 6, as 5' is proportional and vectorially in the same position as, the primary rotor voltage vector 0, 1' in accordance with Figure 2a.

In other words, the locus of the point 5' and so forth is represented by the straight line L5. To the voltage 6, 5' must be vectorially added, the voltage 3', 4', which, in line with the previous explanation, is proportional and opposite in phase position to, the primary stator voltage in SP, that means to 1' 2. The locus of the vector ends 4, 4' and so forth is, therefore, the straight line L4.

As before, 6, 4 represents the compensating voltage component, whereas 4, 4' is the speed regulating voltage component, which, due to the use of the transformer T in the way described, (namely the connection of its primary winding to the points of connection between SP and RP), is increased as compared with Figure 1 for the same displacement angle α of the induction regulator IR. The common essential feature of both the arrangements illustrated by Figures 1 and 2 is that the voltage of the additional auxiliary windings SA and SAR respectively, contains a constant voltage component 6, 5 at right angles to the variable voltage, this constant voltage component being utilised to obtain the phase compensating voltage 6, 4 required for the correct operation of the arrangement.

Figure 2C:
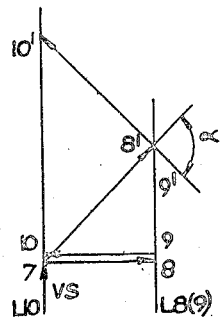

Figure 2c represents the voltage vector diagram for the stator circuit of the motor. The voltage vectors 7, 8' and so forth of the secondary winding SSS in the regulator stator are proportional and, owing to the position of said winding as shown in Figure 2, are displaced by 90 degrees with respect to the stator primary voltage vectors 1, 2, 1' 2 and so forth. The voltage vectors 9, 10 and 9', 10' of the second secondary winding SAS of the transformer T are proportional and owing to the zig-zag connections shown, are displaced by 90 degrees with respect to voltage vectors 0, 1, 0, 1', and so forth.

In this case the transformation ratios are so chosen that the voltages of the two windings are equal in amount, so that their vectorial sum as shown in Figure 2c, contains only a variable voltage, without a voltage vectorially at right angles to it, the locus of the vector ends 10, 10' and so forth, being the straight line L10.

A voltage vectorially at right angles may, however, be introduced, in order to obtain shifting of the stator voltage in phase, which for certain design purposes may be beneficial.

In Figure 2c the variable voltage 7, 10' will be added vectorially to the supply voltage the direction and vector end of which are indicated by an arrow VS in Figure 2c.

In other words, the voltage applied to the motor stator winding will vary with the regulator position, making it possible to obtain the above described beneficial effects of stator voltage regulation.

The additional voltage introduced in the stator circuit will vary in unison with variations in the voltage in the secondary circuit of the motor, that is to say, it may increase with increasing difference of the actual speed from the synchronous speed, and will change its vectorial direction when the motor speed passes through the synchronous speed. The introduction of this additional voltage in the manner described can take place in different vectorial directions.

If introduced essentially additively in the hypersynchronous range and, therefore, essentially subtractively in the sub-synchronous range, the effective voltage imposed on the stator winding will increase with increasing speed, resulting in an increasing flux with increasing speed. This renders the motor suitable for application to loads requiring increasing torque with increasing speed, that is to say, the first above-mentioned group, of which fans and centrifugal pumps are representative.

This arrangement is preferably, or at least to a large extent, used in the sub-synchronous range, in order to obtain low transformer voltages at the lowest speeds without exceeding the transformer voltages at the top end of the range.

If the additional voltage supplied to the stator winding ST by the series-connected secondary windings SSS and SAS (Figure 3) connected between it and the supply is introduced in the reverse sense to that above described, that is to say, additively at low speeds and subtractively at high speeds, the motor is rendered suitable for application where constant output and diminishing torque with increasing speed are required as, for instance, in the second above-mentioned group, of which the drives for various machine tools are representative.

In order to reverse the direction of rotation of the motor in any of the described arrangements besides changing over of two supply lines, steps have to be taken to ensure the correct introduction of the compensating voltage for the other direction of rotation.

This is necessary in view of the fact that the leading voltage component suitable for the compensation in one direction of rotation becomes lagging and, therefore, counter-compensating in the other direction of rotation, if no changes in the internal connections are carried out.

The direct way of achieving this result would be to change the beginning and the end of each individual phase winding either in the primary or secondary of the induction regulator, including the additional windings in the rotor circuit.

In order to avoid the increased number of contact terminals, especially those for heavy currents, and of flexibles for the rotor circuit of the induction regulator, thereby entailed, the following simple way can be adopted in accordance with the invention to ensure correct compensation which, moreover, does not require any essentially different speed adjustment of the regulator in the different directions of rotation of the motor.

For this purpose and in accordance with the invention, the numerical proportion between the two voltage components producing the resultant secondary voltage, which is fed into the rotor circuit of the motor, is so altered that the magnetising component becomes negative in the reversed direction of rotation of the motor.

Figure 3:
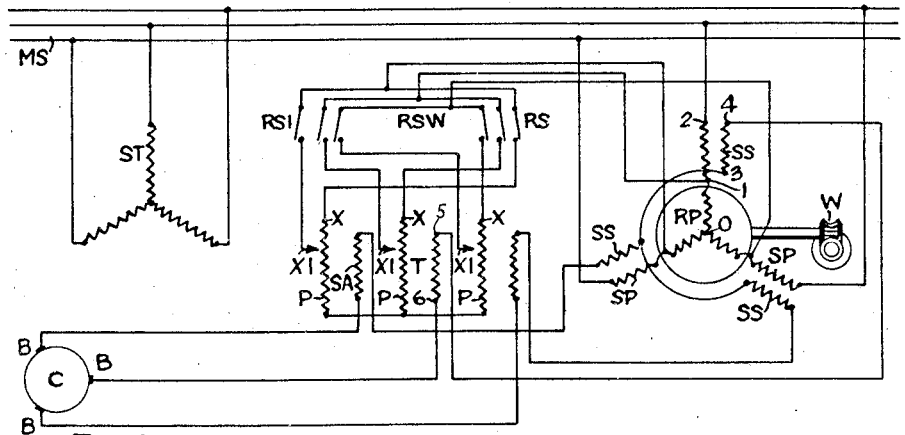
Figure 3 is an example of a further arrangement according to the invention in which a separate transformer is used; in this example a reversing feature is incorporated in the arrangement.

Figure 3 in which the same reference indications as in Figures 1 and 2 are used as far as applicable, illustrates an arrangement comprising the motor M, the induction regulator IR and the transformer T.

The arrangement is, in principle, in so far as rotor regulation of the motor is concerned, the same as in Figure 2 but there is no stator voltage regulation included in the arrangement of Figure 3. Hence, there is only one secondary winding in the regulator stator and in the transformer, (windings SS and SA respectively).

A three-phase feed is provided for the commutator C in Figure 3, the winding SS of the regulator being starred for the purpose.

The primary winding P of the transformer T has a tapping X1 which, by means of the contacts RS1 of a reversing switch RSW, can be connected to the points of connection between the two primary windings of the induction regulator IR for one direction of rotation of the motor M, whilst for the other direction of rotation the ends X of the primary winding of the transformer T are connected to said points of connection between the regulator primary windings by means of the contacts RS of the reversing switch RSW.

Figure 3A:
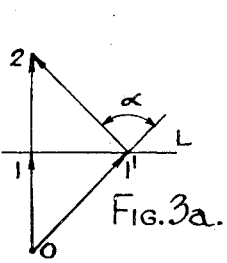
Figures 3a, 3b and 3c are vector diagrams illustrative of the functioning of the arrangement of Figure 3.

The voltage vector diagram Figure 3a refers to the primary circuit of the regulator IR, and is equivalent to Figures 1a and 2a.

Figures 3B, 3C:
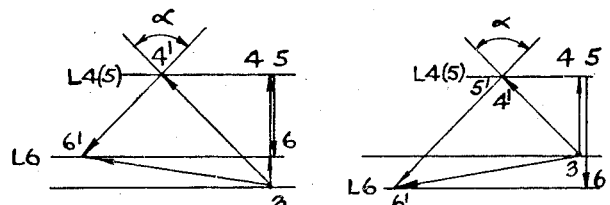

In Figures 3b and 3c the vectors 3, 4 and 3, 4' represent the voltage in the secondary winding SS of the induction regulator IR, and the vectors 5, 6 and 5', 6' represent the voltage in the additional secondary winding SA of the transformer T, these voltages being determined by the transformation ratios between the windings SP and SS of the induction regulator IR and between the primary and secondary windings P and SA of the transformer T.

The vectors 5, 6 and 5', 6' in Figure 3c represent the magnitude of the voltage in the secondary windings SA of the transformer T when the contacts RS of the reversing switch RSW are closed to make contact with the end X of the transformer primary winding P and so include the whole of said winding P in circuit.

When, alternatively the contacts RS1 of the reversing switch RSW are closed to make contact with the tapping X1, the voltage produced in the secondary winding SA of the transformer T has a magnitude represented by the vectors 5, 6 and 5', 6' in Figure 3c, its phase position being unchanged, as compared with Figure 3b, for the same angle α.

With both connections, i. e. to X and X1, the point of origin 3 of the vectors is the same, but the locus L6 of the vector ends changes as shown in Figures 3b and 3c when the connection is made at X and X1, respectively.

The speed controlling voltage components 6, 6' retain their direction, although altering slightly in magnitude for the same displacement angle α, but the fixed or constant magnetising components change their direction as represented by the vectors 3, 6 in Figures 3b and 3c respectively.

The difference between the speed controlling voltages can be utilised to advantage where the speed range in one direction of rotation of the motor is required to differ from that in the other direction of rotation of the motor.

It will be appreciated that this reversing principle can be adapted to any of the arrangements described in the specification, with reference to the connection diagrams, whether designed for rotor voltage control only or for a combined rotor and stator voltage regulation.

I claim:

1. A control system for a multi-phase stator fed commutator motor, comprising a multi-phase single core induction regulator having stator and rotor units each provided with winding slots therein, a primary winding arranged in the slots of one of said units and another primary winding arranged in the slots of the other unit, the phase windings of one of said primary windings being connected at one end to a source of supply and at the other end to the other of said primary windings, the turn ratio of the said two primary windings being approximately unity, a secondary winding arranged in the same slots as those containing one of said primary windings, said secondary winding producing a voltage composed of a variable voltage component of approximately fixed phase position and a constant voltage component of constant phase position at right angles to the phase position of the variable voltage component, an additional winding located in a magnetic circuit independent of the magnetic circuit of the induction regulator and producing a constant voltage component of opposite phase position to the constant voltage component produced by said secondary winding of said induction regulator, and means inductively coupling said additional winding to the supply, said additional winding being series-connected with the said secondary winding, and said series-connected secondary and additional windings being connected to the commutator brushes of the commutator motor to be controlled.

2. A control system for a multi-phase stator fed commutator motor comprising a multi-phase single core induction regulator having stator and rotor units each provided with winding slots therein, a primary winding arranged in the slots of one of said units and another primary winding arranged in the slots of the other unit, the phase windings of one of said primary windings being connected at one end to a source of supply and at the other end to the other of said primary windings, a secondary winding arranged in the same slots as those containing one of said primary windings, and an additional winding arranged in the stator of the commutator motor thereby inductively coupling it to the supply, said additional winding being connected in series with said secondary winding, and said series-connected secondary and additional windings being connected to the commutator brushes of the commutator motor.

3. A control system for a multi-phase stator fed commutator motor comprising a multi-phase single core induction regulator having stator and rotor units each provided with winding slots therein, a primary winding arranged in the slots of one of said units and another primary winding arranged in the slots of the other unit, the phase windings of one of said primary windings being connected at one end to a source of supply and at the other end to the other of said primary windings, a secondary winding arranged in the same slots as those containing one of said primary windings, and a transformer having a primary winding and a secondary winding, said secondary winding of said transformer being series-connected as an additional winding with the said secondary winding of the induction regulator, and said secondary winding of said induction regulator and said secondary winding of said transformer, as an additional winding, in series connection, being connected to the commutator brushes of the commutator motor to be controlled.

4. A control system for a multi-phase stator fed commutator motor comprising a multi-phase single core induction regulator having stator and rotor units provided with winding slots therein, a primary winding arranged in the slots of one of said units and another primary winding arranged in the slots of the other unit, the phase windings of one of said primary windings being connected at one end to a source of supply and at the other end to the other of said primary windings, a secondary winding arranged in the same slots as those containing one of said primary windings, and a transformer having a primary winding and a secondary winding, the said primary winding of said transformer being connected to the points of connection between said primary windings of said induction regulator, the said secondary winding of said transformer being series-connected as an additional winding to said secondary winding of the induction regulator, and said secondary winding of the induction regulator and said secondary winding of said transformer as an additional winding, in series connection, being connected to the commutator brushes of the commutator motor to be controlled.

5. A control system for a multi-phase stator fed commutator motor comprising a multi-phase single core induction regulator having stator and rotor units each provided with winding slots therein, a primary winding arranged in the slots of one of said units and another primary winding arranged in the slots of the other unit, the phase windings of one of said primary windings being connected at one end to a source of supply and at the other end to the other of said primary windings, a secondary winding arranged in the same slots as those containing one of said primary windings, an additional winding located in a magnetic circuit independent of the magnetic circuit of the induction regulator, and means inductively coupling said additional winding to the supply, said additional winding being series-connected with the said secondary winding of said induction regulator, and both ends of the phase windings of said series-connected secondary and additional windings being connected to the commutator brushes of the commutator motor to be controlled.

6. A control system for a multi-phase stator fed commutator motor comprising a multi-phase single core induction regulator having stator and rotor units each provided with winding slots therein, a primary winding arranged in the slots of one of said units and another primary winding arranged in the slots of the other of said units, the phase windings of one of said primary windings being connected at one end to a source of supply and at the other end to the other of said primary windings, two secondary windings arranged in the same slots as those containing one of said primary windings, two additional windings, said additional windings being located in a magnetic circuit independent of the magnetic circuit of the induction regulator, and means inductively coupling said additional windings to the supply, said additional windings being connected respectively in series connection, one to each of said two secondary windings of said induction regulator, and one group of said series-connected secondary and additional windings being connected in the stator circuit of the commutator motor, and the other group of said series-connected secondary and additional windings being connected to the commutator brushes of the commutator motor.

7. A control system for a multi-phase stator fed commutator motor comprising a multi-phase single core induction regulator having stator and rotor units each provided with winding slots therein, a primary winding arranged in the slots of one of said units and another primary winding arranged in the slots of the other unit, the phase windings of one of said primary windings being connected at one end to a source of supply and at the other end to the other of said primary windings, two secondary windings arranged in the same slots as those containing one of said primary windings, and a transformer having a primary winding and two secondary windings which serve as additional windings, the said primary winding of said transformer being connected to the points of connection between said primary windings of said induction regulator, the said two secondary windings of the induction regulator being connected respectively in series connection, one to each of said two secondary windings of said transformer and one group of said series-connected secondary windings being connected in the stator circuit of the commutator motor and the other group of said series-connected secondary windings being connected to the commutator brushes of the commutator motor.

8. A control system for a multi-phase stator fed commutator motor comprising a multi-phase single core induction regulator having stator and rotor units each provided with winding slots therein, a primary winding arranged in the slots of one of said units and another primary winding arranged in the slots of the other unit, the phase windings of one of said primary windings being connected at one end to a source of supply and at the other end to the other of said primary windings, a secondary winding arranged in the same slots as those containing one of said primary windings, a transformer having a primary winding and a secondary winding, the said secondary winding of said transformer being series-connected as an additional winding with the said secondary winding of the induction regulator, and said secondary winding of the induction regulator and said secondary winding of said transformer, as an additional winding, in series connection, being connected to the commutator brushes of the commutator motor, one of the said windings of said transformer having tappings for alternative connection in dependence on the direction of rotation of the commutator motor.

BENNO SCHWARZ.

No references cited.